(12) United States Patent
Qi (10) Patent No.: US 9,413,980 B1
(45) Date of Patent: Aug. 9, 2016

(54) METHODS FOR GENERATING HDR (HIGH DYNAMIC RANGE) IMAGES AND APPARATUSES USING THE SAME

(71) Applicant: VIA Alliance Semiconductor Co., Ltd., Shanghai (CN)

(72) Inventor: Nan Qi, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 14/802,231

(22) Filed: Jul. 17, 2015

(30) Foreign Application Priority Data

Mar. 17, 2015 (CN) .......................... 2015 1 0116190

(51) Int. Cl.
*H04N 5/235* (2006.01)

(52) U.S. Cl.
CPC ........... *H04N 5/2355* (2013.01); *H04N 5/2353* (2013.01)

(58) Field of Classification Search
CPC ......................... H04N 5/2355; H04N 5/23232
See application file for complete search history.

(56) References Cited

U.S. PATENT DOCUMENTS

| 6,747,694 | B1 | 6/2004 | Nishikawa et al. |
| 7,349,574 | B1 * | 3/2008 | Sodini ..................... G06T 5/009 345/589 |
| 2010/0157078 | A1 | 6/2010 | Atanassov et al. |
| 2012/0002082 | A1 * | 1/2012 | Johnson ................... G06T 5/50 348/234 |
| 2014/0152686 | A1 | 6/2014 | Narasimha et al. |

FOREIGN PATENT DOCUMENTS

| EP | 1 986 422 | 10/2008 |
| GB | 2464574 | 4/2010 |

* cited by examiner

*Primary Examiner* — Tuan Ho
(74) *Attorney, Agent, or Firm* — McClure, Qualey & Rodack, LLP (57) ABSTRACT

A method for generating HDR (High Dynamic Range) images, performed by a processing unit, the method at least containing: acquiring a frame 0; obtaining frame statistics information at least includes a first pixel count for a dark area and a second pixel count for a saturate area; calculating the ratio according to the first pixel count and the second pixel count; calculating a first expansion factor and a second expansion factor according to the ratio and the exposure setting of the frame 0; expanding the frame 0 to HDR space using the first expansion factor; expanding a frame 1 to the HDR space using the second expansion factor; and fusing the expanded frame 0 with the expanded frame 1.

28 Claims, 6 Drawing Sheets

METHODS FOR GENERATING HDR (HIGH DYNAMIC RANGE) IMAGES AND APPARATUSES USING THE SAME

CROSS REFERENCE TO RELATED APPLICATIONS

This application claims the benefit of China Patent Application No. 201510116190.8, filed on Mar. 17, 2015, the entirety of which is incorporated by reference herein.

BACKGROUND

1. Technical Field

The present invention relates to image processing, and in particular, it relates to methods for generating HDR (High Dynamic Range) images and apparatuses using the same.

2. Description of the Related Art

HDR (High Dynamic Range) images can show a greater range of luminance levels captured in real-world scenes, from direct sunlight to a faint nebula. It is often achieved by capturing and then combining different exposures of the same subject matter. Non-HDR cameras take photographs with a limited exposure range, resulting in the loss of detail in saturate or dark areas. HDRM (High Dynamic Range Merging) compensates for this loss of detail by capturing multiple photographs at different exposure levels and combining them to produce a photograph representative of a broader tonal range. However, the HDR merging takes a lot of time. Thus, methods for generating HDR images and apparatuses using the same are introduced to reduce the time required for merging.

BRIEF SUMMARY

A method for generating HDR (High Dynamic Range) images, performed by a processing unit, is introduced. The method at least includes: acquiring a frame 0; obtaining frame statistics information at least containing a first pixel count for a dark area and a second pixel count for a saturate area; calculating the ratio according to the first pixel count and the second pixel count; calculating a first expansion factor and a second expansion factor according to the ratio and the exposure setting of the frame 0; expanding the frame 0 to HDR space using the first expansion factor; expanding a frame 1 to the HDR space using the second expansion factor; and fusing the expanded frame 0 with the expanded frame 1.

An embodiment of an apparatus for generating HDR images is introduced. The apparatus at least contains: a camera module controller coupled to a camera module; and a processing unit. The processing unit acquires a frame 0 via the camera module controller; obtains frame statistics information at least containing the first pixel count of a dark area and the second pixel count of a saturate area; calculates the ratio according to the first pixel count and the second pixel count; calculates a first expansion factor and a second expansion factor according to the ratio and an exposure setting of the frame 0; expands the frame 0 to HDR space using the first expansion factor; expands a frame 1 to the HDR space using the second expansion factor; and fuses the expanded frame 0 with the expanded frame 1.

The method for generating HDR images and the apparatus using the same calculate the expansion factors using the ratio of the pixel count of the dark area and the saturate area in the normal-exposure frame (like, frame 0) and the exposure settings of the normal-exposure frame, and then could directly map the pixel values of the LDR frames shot under different exposure settings to the HDR space according to the calculated expansion factors. There is no need to spend a huge amount of hardware resources on the on-line calculation of the camera response function with many LDR frames. Therefore the cost and the power consumption are reduced.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
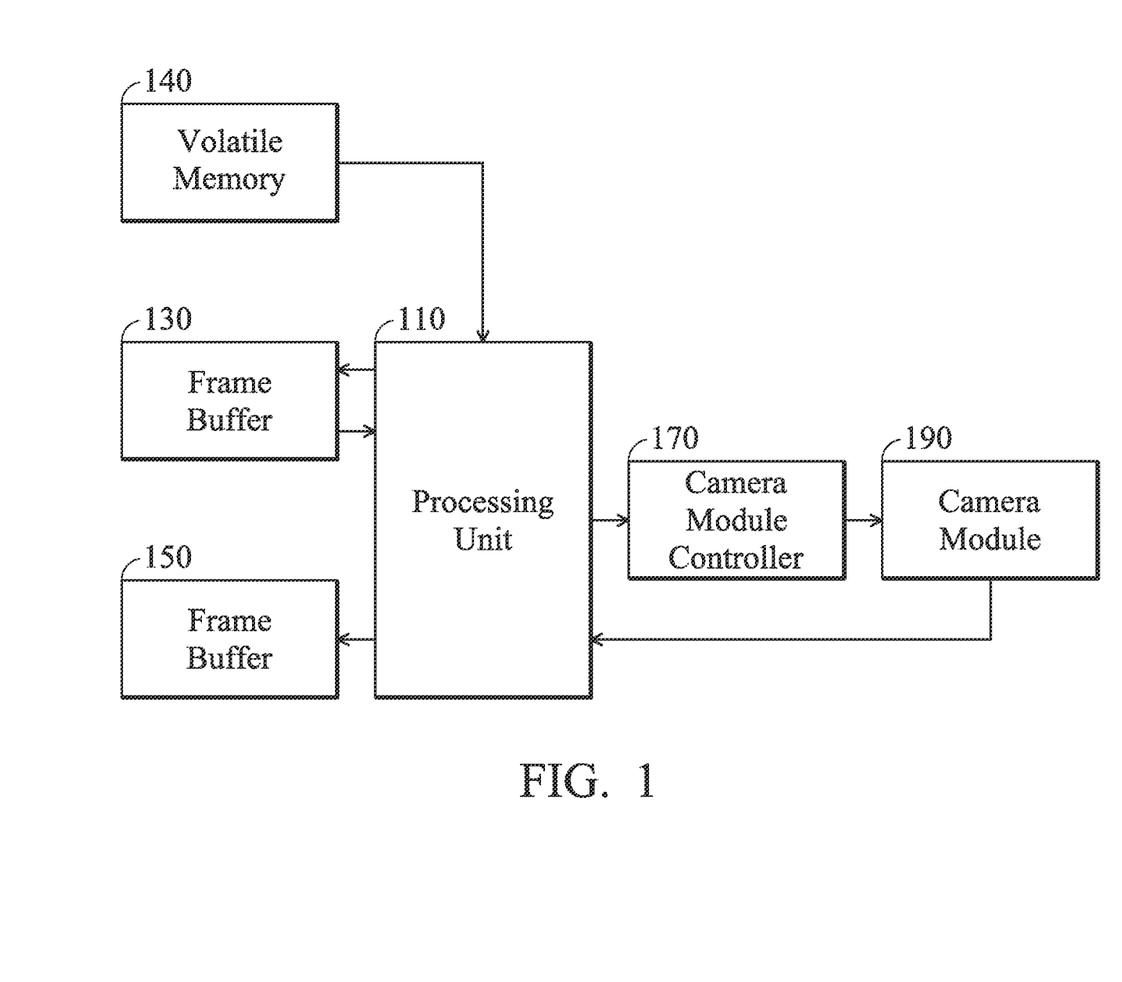
FIG. 1 is a schematic diagram illustrating the system architecture of a computer apparatus according to an embodiment of the invention.

FIG. 1 is a schematic diagram illustrating the system architecture of a computer apparatus according to an embodiment of the invention. The system architecture may be implemented in a desktop computer, a notebook computer, a tablet PC (personal computer), a mobile phone, a digital camera, a digital recorder, or another device which contains at least a processing unit 110. The processing unit 110 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The processing unit 110 may, via a camera module controller 170, control a camera module 190 to capture multiple LDR (Low Dynamic Range) frames and store the LDR frames in a frame buffer 130. The camera module 190 may comprise an image sensor, such as a CMOS (complementary metal-oxide-semiconductor) or CCD (charge-coupled device) sensor, to detect an image in the form of a red, green and blue color, and readout electronic circuits for collecting the sensed data from the image sensor. The processing unit 110 may obtain at least three LDR frames from the frame buffer 130. In an embodiment, the three LDR frames are 12-bit frames. One LDR frame is captured by an AE (Automatic Exposure) algorithm under the optimized exposure settings, referred to as the frame 0 hereinafter. It should be noted that the exposure settings for capturing the frame 0 include a shutter speed, an analog gain and a digital gain and are stored in the frame buffer 130 or a volatile memory 140. The volatile memory 140, such as a DRAM (Dynamic Random Access Memory), for storing necessary data in execution, such as runtime variables, data tables, etc. Another LDR frame is a low-exposure frame, referred to hereinafter as the frame 1. Yet another LDR frame is a high-exposure frame, referred to hereinafter as the frame 2. The processing unit 110 merges the frames 0 to 2 by using an HDRM (High-Dynamic-Range Merging) algorithm to generate an HDR (High Dynamic Range) frame and stores the generated HDR frame in the frame buffer 150. In an embodiment, the output HDR frame is an 18-bit frame.

Figure 2:
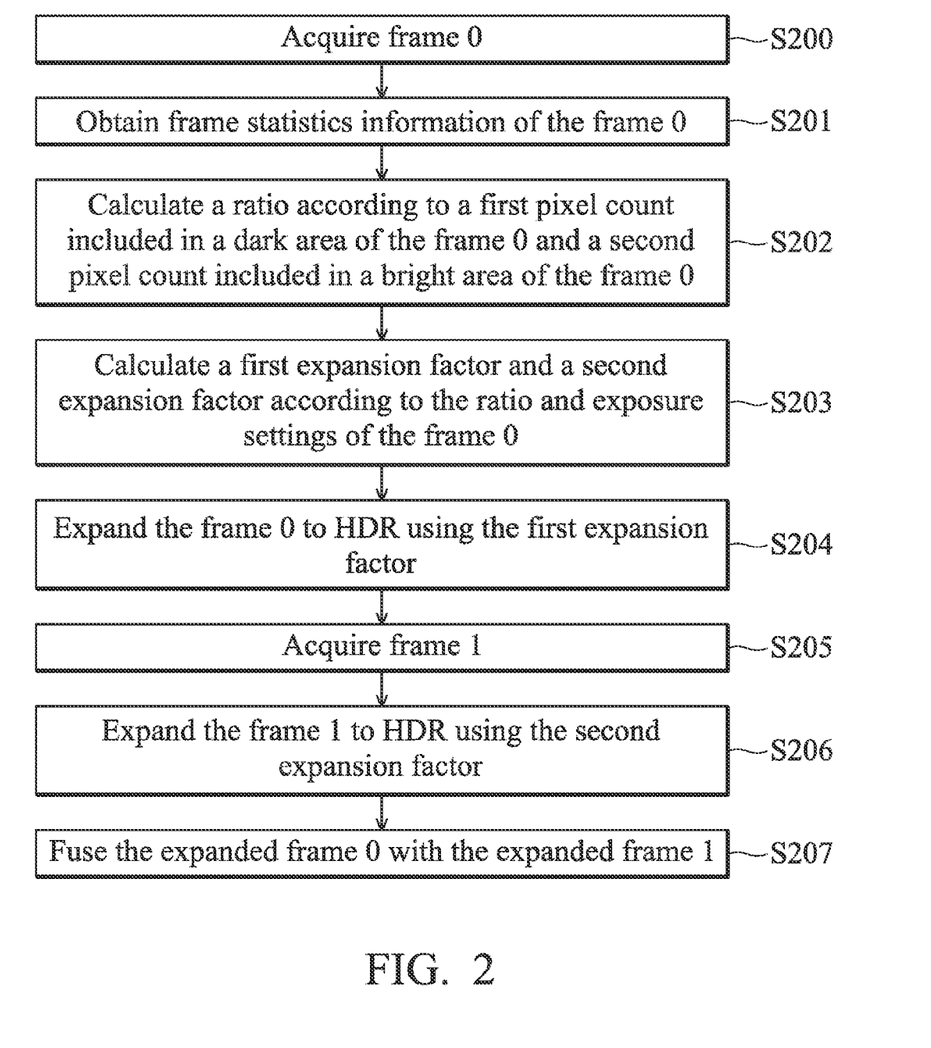
FIG. 2 is a flowchart illustrating a method for generating HDR images, which is performed by a processing unit, according to an embodiment of the invention.

FIG. 2 is a flowchart illustrating a method for generating HDR images, which is performed by a processing unit, according to an embodiment of the invention. The process begins with acquisition of a frame 0 (step S200). Next, the processing unit 110 obtains frame statistics information of the frame 0 (step S201), which has a first total number of pixels in a dark area of the frame 0 and a second total number of pixels in a saturate area of the frame 0. The processing unit 110 calculates the ratio according to the first total number of pixels and the second total number of pixels (step S202). Next, the processing unit 110 calculates a first expansion factor and a second expansion factor according to the ratio and the exposure settings of the frame 0 (step S203). Details of steps S201 to S203 will be described in the following paragraphs. The processing unit 110 expands the frame 0 to HDR using the first expansion factor (step S204). Next, the processing unit 110 acquires a frame 1 from the frame buffer 130 (step S205) and expands the frame 1 to HDR using the second expansion factor (step S206). In an embodiment, the expansion step multiplies each pixel value of the frame 0/1 by the first/second expansion factor. Finally, the processing unit 110 merges the expanded frame 0 with the expanded frame 1 (step S207). In an embodiment, up to this moment, the processing unit 110 of the invention expands the frame 0 with normal-exposure settings and the frame 1 with low-exposure settings to HDR and merges the two frames.

Figure 3:
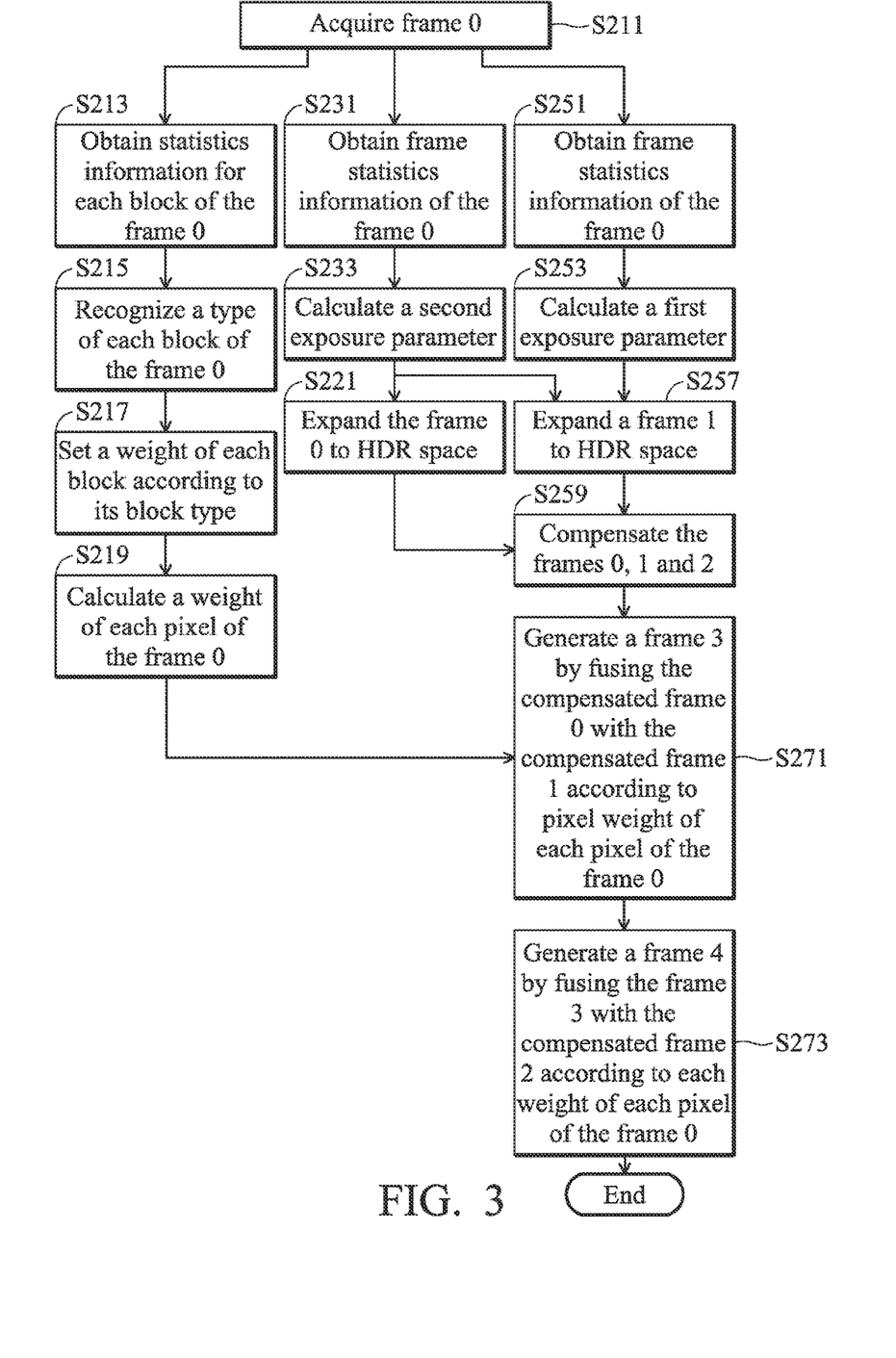
FIG. 3 is a flowchart illustrating a method for generating HDR images, which is performed by a processing unit, according to an embodiment of the invention.
Figure 4:
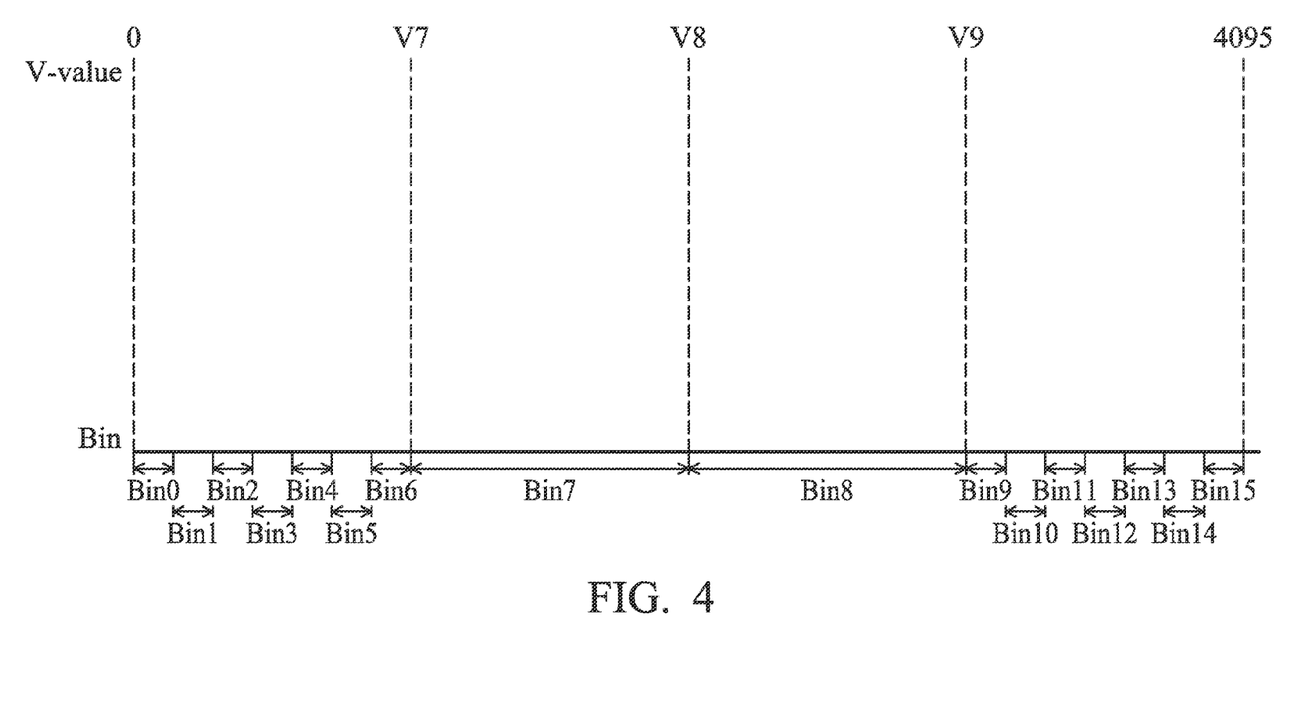
FIG. 4 is a schematic diagram of a luminance histogram for a block according to an embodiment of the invention.

FIG. 3 is a flowchart illustrating a method for generating HDR images, which is performed by a processing unit, according to an embodiment of the invention. The process begins to acquire a frame 0 from the frame buffer 130 (step S211). Next, the processing unit 110 obtains statistics information for each block of the frame 0 (step S213). Specifically, the frame 0 may be divided into m×n blocks and each block contains, for example, 32×32 pixels, and a luminance value of each pixel is calculated. The luminance value of each pixel may be calculated using an Equation:

$$V=0.3\times R+0.6\times G+0.1\times B \quad (1)$$

where R indicates a red value, G indicates a green value, B indicates a blue value and V indicates a luminance value. The processing unit 110 calculates an average luminance AveLum and a luminance histogram of each block. FIG. 4 is a schematic diagram of a luminance histogram for a block according to an embodiment of the invention. Although the embodiments give 12-bit luminance values ranging from 0 to 4095 as an example, the invention should not be limited thereto. The histogram is divided into, for example, 16 bins, and the mini- mum luminance value V8 of Bin8 is set to 2047.5(=4095/2). The minimum luminance values V7 of Bin7 and V9 of Bin9 may be calculated using Equations:

$$V7=4095\times r \quad (2)$$

$$V9=4095\times(1-r) \quad (3)$$

where r may be an arbitrary value between 0 and 0.5. Assume that r is set to 0.25: V7 is 1023.75 and V9 is 3071.25. The luminance values between 0 and V7 is divided into seven bins (Bin0~Bin6) equally and the luminance values between V9 and 4095 is divided into seven bins (Bin9~Bin15). The luminance values of the $8^{th}$ bin (Bin7) range from V7 to V8 and the luminance values of the $9^{th}$ bin (Bin8) range from V8 to V9. In each block, the processing unit 110 distributes each pixel to a corresponding bin according to its luminance value and counts how many pixels are presented in each bin. Exemplary pseudo code for generating the histogram is as follows:

```
LowThr = 4096 >> 2; // LowThr = maximum_12bits * 0.25
HighThr = 4096 - LowThr;
valuePerBin = (LowThr / (blockBinNum/ 2 - 1)); //
blockBinNum = 16
//for each block
for(byIdx = 0; byIdx < block_cnt_y; byIdx ++) {
   for(bxIdx = 0; bxIdx < block_cnt_x; bxIdx ++) {
      lum = image->y[pxlIdx];
      sum += lum;
      if (lum < LowThr) { // (Bin 0~6)
         bin = ((unsigned short)(lum * (((blockBinNum >> 1) -
1) << 2)) >> 12); }
            else if (lum < (maximum_12bits + 1) / 2) { // (Bin 7)
               Bin = ( blockEntryNum / 2 - 1); }
            else if (lum < HighThr) { // (Bin 8)
               Bin =( blockEntryNum / 2); }
            else { // (Bin 9~15)
               tmpLum = lum - HighThr;
               tmpBin = ((unsigned short)(tmpLum *
(((blockBinNum >> 1) - 1) << 2)) >> 12);
               if (tmpBin >= ((blockBinNum >> 1) - 1)){
                  bin = blockBinNum - 1;}
               else {
                  bin = (blockBinNum >> 1) +1 + tmpBin;} }
         bestExpBlockInfor[curLumSumIdx].block_hist[Bin]++; }
      bestExpBlockInfor[curLumSumIdx].block_averVal =
sum / block_size; }
``` where bestExpBlockInfor is a structure array and each structure stores statistics information of one block, which includes a luminance average block_averVal and pixel counts of Bin0 to Bin15 block_hist[Bin].

Subsequently, the processing unit 110 recognizes that each block is a low-exposure type, a normal-exposure type or a high-exposure type according to statistics information obtained by analyzing a luminance average and a histogram of the block (step S215). Specifically, a low-bin threshold and a high-bin threshold within the histogram of one block are calculated. The low-bin threshold and the high-bin threshold may be calculated using Equations:

$$threBinLow \approx (BinNum/2-1)/r\times 0.18 \quad (4)$$

$$threBinHigh \approx BinNum-(BinNum/2-1)/r\times 0.18 \quad (5)$$

where threBinLow indicates a low-bin threshold, threBin-High indicates a high-bin threshold, BinNum indicates a total number of bins within a histogram of the block, for example, BinNum=16, and r may be an arbitrary value between 0 and 0.5. Assume that r is set to 0.25: The low-bin threshold is 5 and the high-bin threshold is 11. For each block, pixels falling within Bin0 to Bin5 belong to a dark area while pixels falling within Bin11 to Bin15 belong to a saturate area. For each block, pixNumLow indicating a pixel count of the dark area is accumulated from the Bin0 to Bin5 and pixNumLow indicating a pixel count of the saturate area is accumulated from the Bin11 to Bin15. The processing unit 110 recognizes whether the block type is low-exposure, normal-exposure or high-exposure by the following judgments. Any block is labeled as a low-exposure type if the pixel count of the dark area pixNumLow is greater than a block-luminance threshold blocklumthres. Any block is labeled as a high-exposure type if the pixel count of the saturate area pixNumHigh is greater than the block-luminance threshold blocklumthres. In an embodiment, the block-luminance threshold is associated with a total number of pixels within the block, for example, blocklumthres=blocksize*ratio. In another embodiment, the processing unit 110 further provides a low-luminance-average threshold AveLumLow (for example, 256) and a high-luminance-average threshold AveLumHigh (for example, 3840). Any block is labeled as a low-exposure type if the luminance average of the block AveLum is less than or equals the low-luminance-average threshold AveLumLow. Any block is labeled as a high-exposure type if the luminance average of the block AveLum is greater than or equals the high-luminance-average threshold AveLumHigh. Any block is labeled as a normal-exposure type if the block has not been labeled as a low-exposure type or a high-exposure type. Exemplary pseudo code for recognizing each block type is as follows:
ThrgridL=5; // lowlight bin threshold, thrBlockBinL=((binNum>>1)−1)*0.18/ratio;
for (x=0; x<block_cnt_x; x++) {
    for (y=0; y<block_cnt_y; y++) {
    curblockIdx=y*block_cnt_x+x; //block index
    while (i<=ThrblockL) {
    j=binNum−i;
    blockcntltmp+=bestExpBlockInfor[curgIdx].block_hist[i]; //accumulate from low to high
    blockcnthtmp+=bestExpBlockInfor[curgIdx].block_hist[j]; // accumulate from high to low
    i++;}
    curBlockAve=m_pBestExpBlockInfor[curgIdx].block_averVal;
    b_AveLumMin=(maximum_12bits+1)>>4; //average low threshold
    b_AveLumMax=(maximum_12bits+1)−g_KAveLumMin; //average high threshold
    ThrblockCnt=blockSize*0.18; //histogram threshold
    //block label is defined by average and histogram of the block
    isUnder=((Gridcntltmp>thrBlockCnt) && (g_KAveLumMin>=curBlockAve));
    isOver=((Gridcnthtmp>thrBlockCnt) && (g_KAveLumMax<=curBlockAve));
    if (isUnder && isOver) {// is over and is under
    blockLabel[curblockIdx]=NORMAL;}// NORMAL=1
    else if (isUnder) {// is under
    blockLabel[curblockIdx]=LOW;}//LOW=0
    else if (isOver) {//is over
    blockLabel[curblockIdx]=HIGH;}// HIGH=2
    else {// is not over and not under
    blockLabel[curblockIdx]=NORMAL;}}}
where blockLabel is an array, in which each cell stores one type of block, such as a low-exposure "LOW", a normal-exposure "NORMAL" and a high-exposure "HIGH". In some embodiments, those skilled in the art may devise the design to take both a pixel count of the dark or saturate area and the luminance average of the block AveLum into account. For example, any block is labeled as a low-exposure type if the pixel count of the dark area pixNumLow is greater than a block-luminance threshold blocklumthres and the luminance average of the block AveLum is less than or equals the low-luminance-average threshold AveLumLow. Any block is labeled as a high-exposure type if the pixel count of the saturate area pixNumHigh is greater than the block-luminance threshold blocklumthres and the luminance average of the block AveLum is greater than or equals the high-luminance-average threshold AveLumHigh. Any block is labeled as a normal-exposure type if the block has not been labeled as a low-exposure type or a high-exposure type.

Figure 6:
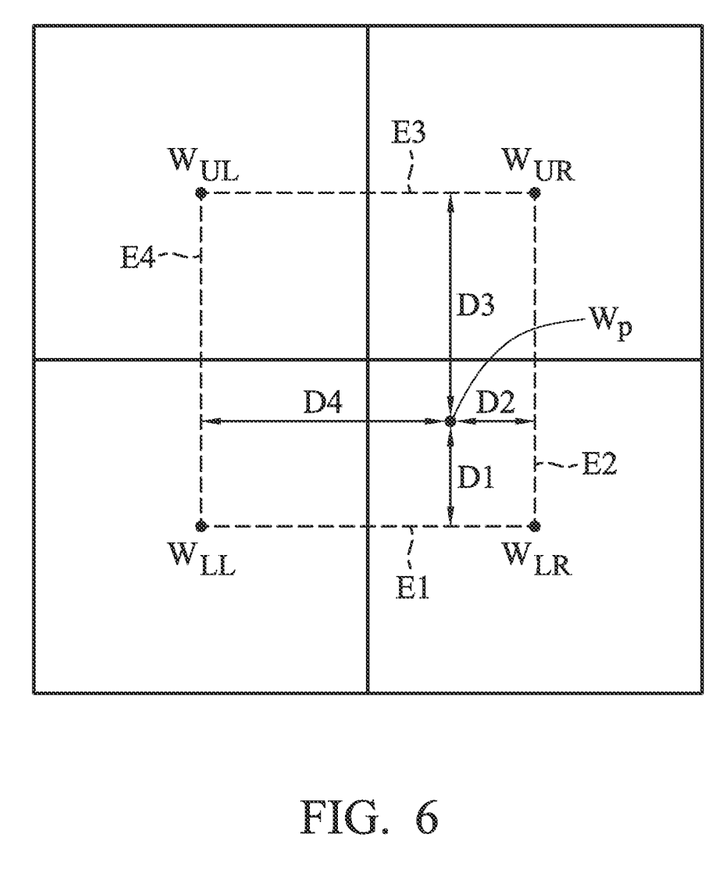
FIG. 6 is a schematic diagram illustrating four surrounding blocks according to an embodiment of the invention.

Subsequently, the processing unit 110 sets the weight of each block (also referred to as a block weight) according to its block type (step S217) and calculates the weight of each pixel of the frame 0 (also referred to as a pixel weight) (step S219). In step S217, specifically, a block weight is set to 0 when the block is labeled as a low-exposure type; a block weight is set to 1 when the block is labeled as a normal-exposure type; and a block weight is set to 2 when the block is labeled as a high-exposure type. Specifically, in step S219, except for pixels located at the boundary and the corner of blocks, the processing unit 110 calculates each pixel weight of the frame 0 according to the four weights of the surrounding blocks and distances from the pixel to the four centers of the surrounding blocks. FIG. 6 is a schematic diagram illustrating four surrounding blocks according to an embodiment of the invention. A rectangle is formed by four center points of surrounding blocks $W_{UL}$, $W_{UR}$, $W_{LL}$ and $W_{LR}$ and includes four edges E1 to E4. Each pixel weight $W_p$ may be calculated using an Equation:

$$W_p = D1 \times D2 \times W_{UL} + D1 \times D4 \times W_{UR} + D3 \times D2 \times W_{LL} + D3 \times D4 \times W_{LR} \quad (6)$$

where $W_{UL}$ indicates a block weight of the upper-left block, $W_{UR}$ indicates a block weight of the upper-right block, $W_{LL}$ indicates a block weight of the lower-left block, $W_{LR}$ indicates a block weight of the lower-right block, D1 indicates a distance from the pixel p to the lower edge E1, D2 indicates a distance from the pixel p to the right edge E2, D3 indicates a distance from the pixel p to the upper edge E3 and D4 indicates a distance from the pixel p to the left edge E4. Each pixel weight of the frame 0 calculated in step S219 will be used in a fusion process of the frame 0 with the frame 1. Details are to be described below.

Figure 5:
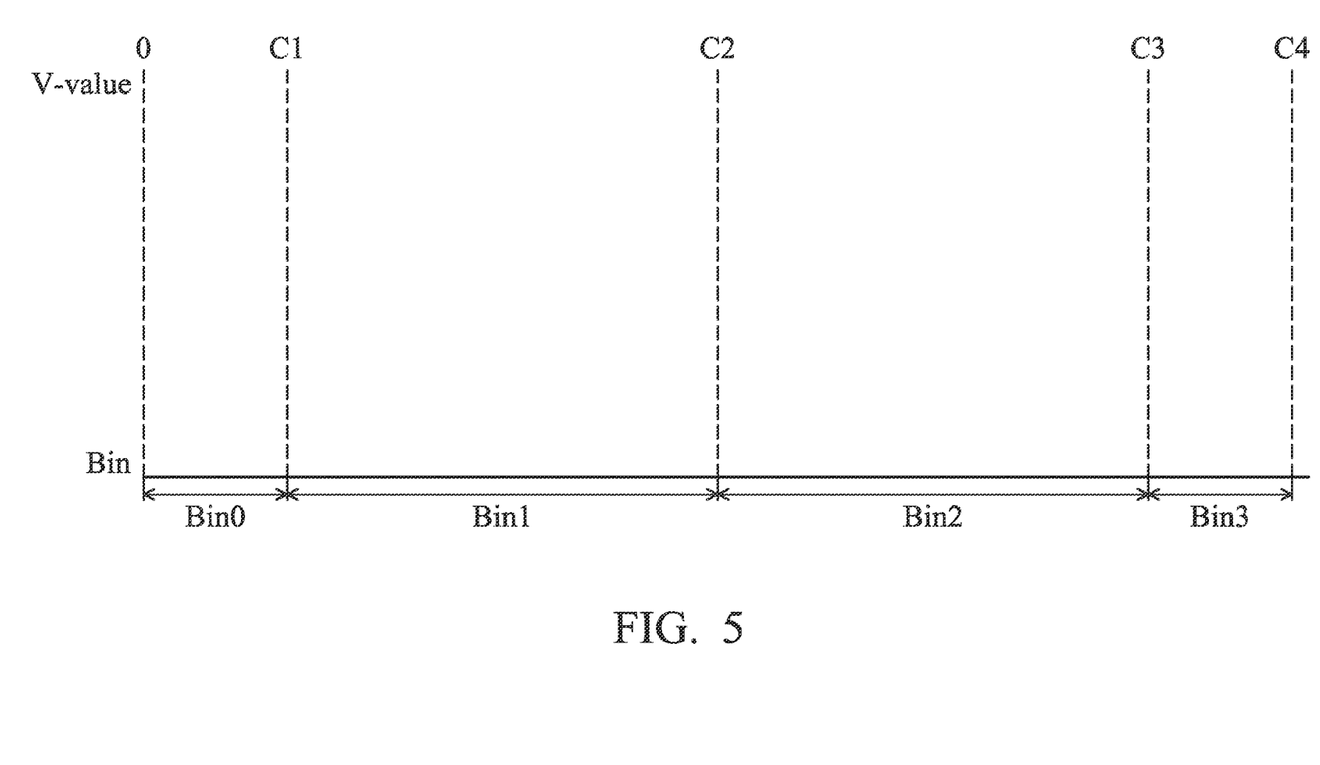
FIG. 5 is a schematic diagram of a luminance histogram for the frame 0 according to an embodiment of the invention.

Now refer back to the initial step S211 of FIG. 3. After acquiring the frame 0, (step S211), the processing unit 110 obtains statistics information of the frame 0 (steps S251 and S231). In step S211, the processing unit 110 may convert color space of RGB into that of HSV. Specifically, in steps S251 and S231, the processing unit 110 calculates a histogram of the frame 0. FIG. 5 is a schematic diagram of a luminance histogram for the frame 0 according to an embodiment of the invention. Luminance values of a dark area (Bin0) ranges from 0 to C1 while luminance values of a saturate area (Bin3) ranges from C3 to C4. Although the embodiments give 12-bit luminance values ranging from 0 to 4095 as an example with C1=511, C3=3583 and C4=4095, the invention should not be limited thereto. For the overall frame 0, the processing unit 110 counts how many pixels are presented in each area and calculates a ratio of a first pixel count included in the dark area (also referred to as a dark-pixel count) over a second pixel count included in the saturate area (also referred to as a saturate-pixel count), denoted as shiftRatio. The ratio may be calculated using an Equation:

$$shiftRatio = pixelNumBin0 / pixelNumBin3 \quad (7)$$

where pixelNumBin0 indicates the first pixel count of the dark area and pixelNumBin3 indicates the second pixel count of the saturate area. Next, the processing unit 110 calculates an expansion multiplier exp_times according to the ratio of the first pixel count over the second pixel count. When the ratio of the dark-pixel count over the saturate-pixel count is less than 8, an Equation (8) may be used to calculate the expansion multiplier exp_times. When the ratio of the dark-pixel count over the saturate-pixel count is greater than or equals to 8, an Equation (9) may be used to calculate the expansion multiplier exp_times.

$$\text{exp\_times} = a \times \text{shiftRatio} \times \text{shiftRatio} + b \times \text{shiftRatio} + c \quad (8)$$

$$\text{exp\_times} = d \times \text{shiftRatio} \times \text{shiftRatio} + e \times \text{shiftRatio} + f \quad (9)$$

where a, b, c, d, e and f are floating numbers. Subsequently, the processing unit 110 calculates a first exposure parameter required for processing frame 1 (step S253) and a second exposure parameter required for processing frame 2 (step S233) according to the ratio shiftRatio derived from the statistics information of the frame 0 and exposure settings of the frame 0. The exposure settings include a shutter speed (denoted as sht), an analog gain (denoted as ag) and a digital gain (denoted as dg). The exposure settings may be a multiplier of sht, ag and dg. The first exposure parameter Para1 and the second exposure parameter Para2 may be calculated using Equations:

$$\text{Para1} = sht \times ag \times dg \times \text{exp\_times}/\text{expValue} \quad (10)$$

$$\text{Para2} = sht \times ag \times dg \times \text{exp\_times} \quad (11)$$

where expValue indicates a fixed expansion value being a ratio of the second exposure parameter over the first exposure parameter. In an embodiment of expanding and fusing 12-bit LDR frames to generate an 18-bit HDR frame, expValue=64.

After calculating the second exposure parameter Para2 (step S233), the processing unit 110 expands the frame 0 to HDR space (step S221). In step S221, the exemplary pseudo code used for calculating the first expansion factor of the frame 0 is as follows:

curveMapValNormal=curveTable_*AVR*[0]×sht×ag× dg+curveTable_*AVR*[1];

curveMapValHigh=curveTable_*AVR*[0]×Para2+cur- veTable_*AVR*[1];

slope_Normal=curveMapValHigh/curveMapValNor- mal;

where slope_Normal indicates the first expansion factor of the frame 0, curveTable_AVR[0] is a calibrated slope associated with the image sensor of the camera module 190, curveTable_AVR[1] is a calibrated y-intercept associated with the image sensor of the camera module 190, sht×ag×dg indicates the exposure settings of the frame 0 (where sht indicates the shutter speed of the frame 0, ag indicates the analog gain of the frame 0 and dg indicates the digital gain of the frame 0) and Para2 indicates the second exposure parameter calculated using Equation (11). The processing unit 110 multiplies an HSV value of each pixel in the frame 0 with the first expansion factor slope_Normal to expand the frame 0 to the HDR space.

After calculating the first exposure parameter Para1 (step S253), the processing unit 110 directs the camera module controller 170 to shoot a low-exposure frame (referred to as a frame 1) according to the exposure settings represented by the calculated first exposure parameter Para1 and stores to the frame buffer 130. In addition, after calculating the second exposure parameter Para2 (step S233), the processing unit 110 directs the camera module controller 170 to shoot a high-exposure frame (referred to as a frame 2) according to the exposure settings represented by the calculated second exposure parameter Para2 and stores to the frame buffer 130. After calculating the first exposure parameter Para1 (step S253) and the second exposure parameter Para2 (step S233), the processing unit 110 expands the frame 1 to the HDR space (step S257). In step S257, the exemplary pseudo code used for calculating the second expansion factor of the frame 1 is as follows:

curveMapValLow=curveTable_*AVR*[0]×Para1+cur- veTable_*AVR*[1];

curveMapValHigh=curveTable_*AVR*[0]×Para2+cur- veTable_*AVR*[1];

slope_Low=curveMapValHigh/curveMapValLow;

where slope_Low indicates the second expansion factor of the frame 1, curveTable_AVR[0] is a calibrated slope associated with the image sensor of the camera module 190, curveTable_AVR[1] is a calibrated y-intercept associated with the image sensor of the camera module 190, Para1 indicates the first exposure parameter calculated in step S253 according to Equation (10) and Para2 indicates the second exposure parameter calculated in step S233 according to Equation (11). The processing unit 110 multiplies an HSV value of each pixel in the frame 1 with the second expansion factor slope_Low to expand the frame 1 to the HDR space.

In step S259, the expanded frame 0, the expanded frame 1 and the obtained frame 2 are compensated. Specifically, the processing unit 110 compensates saturated pixels and dark pixels of the expanded frame 0 using a first exposure compensation method. Specifically, the first exposure compensation method detects dark pixels of the expanded frame 0 (those whose luminance values fall within 0 to 128×slope_Normal, for example) and replaces the luminance values of the detected dark pixels of the expanded frame 0 with luminance pixel values of the frame 2 at the same locations. The first exposure compensation method further detects saturated pixels of the expanded frame 0 (those whose luminance values fall within 3967×slope_Normal to 4095, for example) and replaces the luminance values of the detected saturated pixels of the expanded frame 0 with luminance pixel values of the frame 1 at the same locations. Moreover, the processing unit 110 compensates dark pixels of the expanded frame 1 using a second exposure compensation method. Specifically, the second exposure compensation method detects dark pixels of the expanded frame 1 (those whose luminance values fall within 0 to 128×slope_Low, for example) and replaces the luminance values of the detected dark pixels of the expanded frame 1 with luminance pixel values of the frame 0 at the same locations. Furthermore, the processing unit 110 compensates saturated pixels of the frame 2 using a third exposure compensation method. Specifically, the third exposure compensation method detects saturated pixels of the frame 2 (those whose luminance values fall within 3967 to 4095, for example) and replaces the luminance values of the detected saturated pixels of the frame 2 with luminance pixel values of the frame 0 at the same locations.

The processing unit 110 generates a frame 3 by fusing the compensated frame 0 with the compensated frame 1 according to pixel weight of each pixel of the frame 0 calculated in step S219 and stores the frame 3 in the frame buffer 150 (step S271). Specifically, in step S271, when a pixel weight of any pixel of the frame 0 is less than or equal to a threshold (e.g. 64), the processing unit 110 fuses the HSV values of this pixel of the frame 0 with the HSV values of the compensated frame 1 at the same location to generate HSV values of the frame 3 at the same location. When a pixel weight of any pixel of the frame 0 is greater than the threshold, the processing unit 110 treats the HSV values of this pixel of the frame 0 as the HSV values of the frame 3 at the same location directly. Exemplary pseudo code for image fusion of the compensated frame 0 with the compensated frame 1 is as follows:
if ((1==frameNum) && (pixelweight[index1]<=64)) {// when input frame is frame 1,
reference frame is frame 0
   weightRef=pixelweight[index1];
   weightIn=1.0−weightRef;
   outPixH=inputImg→HDRdata[index+0]*weightIn+ reflmg→HDRdata[index+0]*weightRef; // H channel fusion
     dst→HDRdata[index]=outPixH;
   outPixS=inputImg→HDRdata[index+1]*weightIn+ reflmg→HDRdata[index+1]*weightRef; // S channel fusion
     dst→HDRdata[index+1]=outPixS;
   outPixV=inputImg→HDRdata[index+2]*weightIn+ reflmg→HDRdata[index+2]*weightRef; // V channel fusion
     dst→HDRdata[index+2]=outPixV;}
else if ((1==frameNum) && (pixelweight[index1]>64)) {
   outPixH=reflmg→HDRdata[index+0]; // H channel from reference frame(frame 0)
     dst→HDRdata[index]=outPixH;
   outPixS=reflmg→HDRdata[index+1]; // S channel from reference frame(frame 0)
     dst→HDRdata[index+1]=outPixS;
   outPixV=reflmg→HDRdata[index+2]; // V channel from reference frame(frame 0)
     dst→HDRdata[index+2]=outPixV;}
where pixelweight[index1] indicates the weight of the (index1)-th pixel, inputImg represents the compensated frame 1, reflmg represents the compensated frame 0 and dst represents the frame 3.

The processing unit 110 generates a frame 4 by fusing the frame 3 with the compensated frame 2 according to pixel weight of each pixel of the frame 0 calculated in step S219 and stores the frame 4 in the frame buffer 150 (step S273). The frame 4 is the final HDR frame. In step S273, specifically, when a pixel weight of any pixel of the frame 0 is greater than a threshold, the processing unit 110 fuses the HSV values of the frame 3 at the same location with the HSV values of the compensated frame 2 at the same location to generate HSV values of the frame 4 at the same location. When a pixel weight of any pixel of the frame 0 is not greater than the threshold, the processing unit 110 treats the HSV values of the frame 3 at the same location as the HSV values of the frame 4 at the same location directly. Exemplary pseudo code for image fusion of the frame 3 with the compensated frame 2 is as follows:
if ((2==frameNum) && (pixelweight[index1]>1.0)) {//input frame is frame 2, ref frame is fusion result of frame 0, 1
   weightIn=pixelweight[index1]−1;
   weightRef=1.0−weightIn;
   outPixH=inputImg→HDRdata[index+0]*weightIn+ reflmg→HDRdata[index+0]*weightRef;
     dst→HDRdata[index]=outPixH;
   outPixS=inputImg→HDRdata[index+1]*weightIn+ reflmg→HDRdata[index+1]*weightRef;
     dst→HDRdata[index+1]=outPixS;
   outPixV=inputImg→HDRdata[index+2]*weightIn+ reflmg→HDRdata[index+2]*weightRef;
     dst→HDRdata[index+2]=outPixV;}
else {
   outPixH=reflmg→HDRdata[index+0];
     dst→HDRdata[index]=outPixH;
   outPixS=reflmg→HDRdata[index+1];
     dst→HDRdata[index+1]=outPixS;
   outPixV=reflmg→HDRdata[index+2];
     dst→HDRdata[index+2]=outPixV;
where pixelweight[index1] indicates the weight of the (index1)-th pixel, inputImg represents the compensated frame 2, reflmg represents the frame 3 and dst represents the frame 4.

The method for generating HDR images and the apparatus using the same calculates the expansion factors using the ratio of the pixel count of the dark area and the saturate area in the normal-exposure frame (like, frame 0) and the exposure settings of the normal-exposure frame, and then may directly map the pixel values of the LDR frames being shot under different exposure settings to the HDR space according to the calculated expansion factors. There is no need to consume a huge amount of hardware resources to calculate the camera response function with many LDR frames in real-time. Therefore the cost and the power consumption are reduced.

Although the embodiment has been described in FIG. 1 as having specific elements, it should be noted that additional elements may be included to achieve better performance without departing from the spirit of the invention. While the process flows described in FIGS. 2 and 3 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for generating HDR (High Dynamic Range) images, performed by a processing unit, the method comprising:
   acquiring a frame 0;
   obtaining frame statistics information comprising a first pixel count of a dark area and a second pixel count of a saturate area;
   calculating a ratio according to the first pixel count and the second pixel count;
   calculating a first expansion factor and a second expansion factor according to the ratio and an exposure setting of the frame 0;
   expanding the frame 0 to HDR space using the first expansion factor;
   expanding a frame 1 to the HDR space using the second expansion factor; and
   fusing the expanded frame 0 with the expanded frame 1.

2. The method of claim 1, wherein the ratio is calculated by an Equation:

shiftRatio=pixelNumBin0/pixelNumBin3, wherein shiftRatio indicates the ratio, pixelNumBin0 indicates the first pixel count and pixelNumBin3 indicates the second pixel count.

3. The method of claim 1, wherein step for calculating a first expansion factor and a second expansion factor according to the ratio and an exposure setting of the frame 0 further comprises:
   calculating a first exposure parameter and a second exposure parameter according to the ratio and the exposure setting;
   calculating the first expansion factor using the second exposure parameter and the exposure setting; and calculating the second expansion factor using the first exposure parameter and the second exposure parameter, wherein the ratio of the second exposure parameter over the first exposure parameter is a fixed expansion value.

4. The method of claim 3, wherein the first exposure parameter is calculated by Equations:

$$\text{exp\_times} = a \times \text{shiftRatio} \times \text{shiftRatio} + b \times \text{shiftRatio} + c;$$

$$\text{Para1} = sht \times ag \times dg \times \text{exp\_times}/\text{expValue},$$

wherein Para1 indicates the first exposure parameter, shiftRatio indicates the ratio, a, b and c are floating numbers, sht×ag×dg indicates the exposure setting of the frame 0, and expValue indicates the fixed expansion value.

5. The method of claim 3, wherein the second exposure parameter is calculated by Equations:

$$\text{exp\_times} = a \times \text{shiftRatio} \times \text{shiftRatio} + b \times \text{shiftRatio} + c;$$

$$\text{Para2} = sht \times ag \times dg \times \text{exp\_times},$$

wherein Para2 indicates the second exposure parameter, shiftRatio indicates the ratio, a, b and c are floating numbers, and sht×ag×dg indicates the exposure setting of the frame 0.

6. The method of claim 3, wherein the first expansion factor is calculated by Equations:

$$\text{curveMapValNormal} = \text{curveTable\_AVR}[0] \times sht \times ag \times dg + \text{curveTable\_AVR}[1];$$

$$\text{curveMapValHigh} = \text{curveTable\_AVR}[0] \times \text{Para2} + \text{curveTable\_AVR}[1]; \text{ and}$$

$$\text{slope\_Normal} = \text{curveMapValHigh}/\text{curveMapValNormal},$$

wherein slope_Normal indicates the first expansion factor, curveTable_AVR[0] is a calibrated slope associated with an image sensor, curveTable_AVR[1] is a calibrated y-intercept associated with the image sensor, sht×ag×dg indicates the exposure setting of the frame 0 and Para2 indicates the second exposure parameter.

7. The method of claim 3, wherein the second expansion factor is calculated by Equations:

$$\text{curveMapValLow} = \text{curveTable\_AVR}[0] \times \text{Para1} + \text{curveTable\_AVR}[1];$$

$$\text{curveMapValHigh} = \text{curveTable\_AVR}[0] \times \text{Para2} + \text{curveTable\_AVR}[1]; \text{ and}$$

$$\text{slope\_Low} = \text{curveMapValHigh}/\text{curveMapValLow},$$

wherein slope_Low indicates the second expansion factor, curveTable_AVR[0] is a calibrated slope associated with an image sensor, curveTable_AVR[1] is a calibrated y-intercept associated with the image sensor, Para1 indicates the first exposure parameter and Para2 indicates the second exposure parameter.

8. The method of claim 1, wherein the step for expanding the frame 0 to HDR space using the first expansion factor further comprises multiplying each pixel value of the frame 0 with the first expansion factor, and the step for expanding a frame 1 to the HDR space using the second expansion factor further comprises multiplying each pixel value of the frame 1 with the second expansion factor.

9. The method of claim 1, wherein the first exposure setting of the frame 0 is a normal-exposure setting and the frame 1 is a low-exposure frame.

10. The method of claim 1, further comprising:
acquiring a frame 2, wherein the frame 2 is a high-exposure frame; and
fusing the frame 2 with the fusing result of the expanded frame 0 with the expanded frame 1.

11. The method of claim 10, further comprising:
compensating saturated pixels and dark pixels of the expanded frame 0 using a first exposure compensation method;
compensating dark pixels of the expanded frame 1 using a second exposure compensation method; and
compensating saturated pixels of the frame 2 using a third exposure compensation method.

12. The method of claim 11, wherein the first exposure compensation method replaces luminance values of the dark pixels of the expanded frame 0 with luminance pixel values of the frame 2 at the same locations and replaces luminance values of the saturated pixels of the expanded frame 0 with luminance pixel values of the frame 1 at the same locations, the second exposure compensation method replaces luminance values of the dark pixels of the expanded frame 1 with luminance pixel values of the expanded frame 0 at the same locations and the third exposure compensation method replaces luminance values of the saturated pixels of the frame 2 with the luminance pixel values of the expanded frame 0 at the same locations.

13. The method of claim 1, further comprising:
dividing the frame 0 into a plurality of blocks;
obtaining block statistics information for each block of the frame 0;
recognizing a type of each block of the frame 0 according to the block statistics information;
setting a block weight according to the type of each block;
calculating pixel weight of each pixel of the frame 0 according to the block weights; and
fusing the expanded frame 0 with the expanded frame 1 according to the pixel weight.

14. The method of claim 13, wherein the pixel weight is calculated by an Equation:

$$W_p = D1 \times D2 \times W_{UL} + D1 \times D4 \times W_{UR} + D3 \times D2 \times W_{LL} + D3 \times D4 \times W_{LR},$$

where $W_p$ indicates the pixel weight of a pixel of the frame 0, $W_{UL}$ indicates a block weight of an upper-left block, $W_{UR}$ indicates a block weight of an upper-right block, $W_{LL}$ indicates a block weight of a lower-left block, $W_{LR}$ indicates a block weight of a lower-right block, D1 indicates a distance from the pixel to a lower edge, D2 indicates a distance from the pixel to a right edge, D3 indicates a distance from the pixel to an upper edge and D4 indicates a distance from the pixel to a left edge.

15. An apparatus for generating HDR (High Dynamic Range) images, comprising:
a camera module controller, coupled to a camera module;
a processing unit acquiring a frame 0 via the camera module controller; obtaining frame statistics information comprising a first pixel count of a dark area and a second pixel count of a saturate area; calculating a ratio according to the first pixel count and the second pixel count; calculating a first expansion factor and a second expansion factor according to the ratio and an exposure setting of the frame 0; expanding the frame 0 to HDR space using the first expansion factor; expanding a frame 1 to the HDR space using the second expansion factor; and fusing the expanded frame 0 with the expanded frame 1.

16. The apparatus of claim 15, wherein the ratio is calculated by an Equation:

shiftRatio=pixelNumBin0/pixelNumBin3, wherein shiftRatio indicates the ratio, pixelNumBin0 indicates the first pixel count and pixelNumBin3 indicates the second pixel count.

17. The apparatus of claim 15, wherein the processing unit further calculates a first exposure parameter and a second exposure parameter according to the ratio and the exposure setting; calculates the first expansion factor using the second exposure parameter and the exposure setting; and calculates the second expansion factor using the first exposure parameter and the second exposure parameter, wherein the ratio of the second exposure parameter over the first exposure parameter is a fixed expansion value.

18. The apparatus of claim 17, wherein the first exposure parameter is calculated by Equations:

exp_times=$a$×shiftRatio×shiftRatio+$b$×shiftRatio+$c$;

Para1=$sht$×$ag$×$dg$×exp_times/expValue, wherein Para1 indicates the first exposure parameter, shiftRatio indicates the ratio, a, b and c are floating numbers, sht×ag×dg indicates the exposure setting of the frame 0, and expValue indicates the fixed expansion value.

19. The apparatus of claim 17, wherein the second exposure parameter is calculated by Equations:

exp_times=$a$×shiftRatio×shiftRatio+$b$×shiftRatio+$c$;

Para2=$sht$×$ag$×$dg$×exp_times, wherein Para2 indicates the second exposure parameter, shiftRatio indicates the ratio, a, b and c are floating numbers, and sht×ag×dg indicates the exposure setting of the frame 0.

20. The apparatus of claim 17, wherein the first expansion factor is calculated by Equations:

curveMapValNormal=curveTable_$AVR$[0]×$sht$×$ag$×$dg$+curveTable_$AVR$[1];

curveMapValHigh=curveTable_$AVR$[0]×Para2+curveTable_$AVR$[1]; and slope_Normal=curveMapValHigh/curveMapValNormal, wherein slope_Normal indicates the first expansion factor, curveTable_AVR[0] is a calibrated slope associated with an image sensor, curveTable_AVR[1] is a calibrated y-intercept associated with the image sensor, sht×ag×dg indicates the exposure setting of the frame 0 and Para2 indicates the second exposure parameter.

21. The apparatus of claim 17, wherein the second expansion factor is calculated by Equations:

curveMapValLow=curveTable_$AVR$[0]×Para1+curveTable_$AVR$[1];

curveMapValHigh=curveTable_$AVR$[0]×Para2+curveTable_$AVR$[1]; and slope_Low=curveMapValHigh/curveMapValLow, wherein slope_Low indicates the second expansion factor, curveTable_AVR[0] is a calibrated slope associated with an image sensor, curveTable_AVR[1] is a calibrated y-intercept associated with the image sensor, Para1 indicates the first exposure parameter and Para2 indicates the second exposure parameter.

22. The apparatus of claim 15, wherein the processing unit multiplies each pixel value of the frame 0 with the first expansion factor to expand the frame 0 to the HDR space and multiplies each pixel value of the frame 1 with the second expansion factor to expand the frame 1 to the HDR space.

23. The apparatus of claim 15, wherein the first exposure setting of the frame 0 is a normal-exposure setting and the frame 1 is a low-exposure frame.

24. The apparatus of claim 15, wherein the processing unit further acquires a frame 2, wherein the frame 2 is a high-exposure frame; and fuses the frame 2 with the fusing result of the expanded frame 0 with the expanded frame1.

25. The apparatus of claim 24, wherein the processing unit further compensates saturated pixels and dark pixels of the expanded frame 0 using a first exposure compensation method; compensates dark pixels of the expanded frame 1 using a second exposure compensation method; and compensates saturated pixels of the frame 2 using a third exposure compensation method.

26. The apparatus of claim 25, wherein the first exposure compensation method replaces luminance values of the dark pixels of the expanded frame 0 with luminance pixel values of the frame 2 at the same locations and replaces luminance values of the saturated pixels of the expanded frame 0 with luminance pixel values of the frame 1 at the same locations, the second exposure compensation method replaces luminance values of the dark pixels of the expanded frame 1 with luminance pixel values of the expanded frame 0 at the same locations and the third exposure compensation method replaces luminance values of the saturated pixels of the frame 2 with the luminance pixel values of the expanded frame 0 at the same locations.

27. The apparatus of claim 15, wherein the processing unit further divides the frame 0 into a plurality of blocks; obtains block statistics information for each block of the frame 0; recognizes a type of each block of the frame 0 according to the block statistics information; sets a block weight according to the type of each block; calculates pixel weight of each pixel of the frame 0 according to the block weights; and fuses the expanded frame 0 with the expanded frame 1 according to the pixel weight.

28. The apparatus of claim 27, wherein the pixel weight is calculated by an Equation:

$W_p = D1 \times D2 \times W_{UL} + D1 \times D4 \times W_{UR} + D3 \times D2 \times W_{LL} + D3 \times D4 \times W_{LR}$, where $W_p$ indicates the pixel weight of a pixel of the frame 0, $W_{UL}$ indicates a block weight of an upper-left block, $W_{UR}$ indicates a block weight of an upper-right block, $W_{LL}$ indicates a block weight of a lower-left block, $W_{LR}$ indicates a block weight of a lower-right block, D1 indicates a distance from the pixel to a lower edge, D2 indicates a distance from the pixel to a right edge, D3 indicates a distance from the pixel to an upper edge and D4 indicates a distance from the pixel to a left edge.

* * * * *